(12) United States Patent
Ibrahim et al.

(10) Patent No.: US 10,210,114 B2
(45) Date of Patent: Feb. 19, 2019

(54) INTERRUPT-DRIVEN I/O ARBITER FOR A MICROCOMPUTER SYSTEM

(71) Applicant: UNIVERSITI TEKNOLOGI MALAYSIA, Johor Bahru, Johor (MY)

(72) Inventors: Muhammad Nasir Bin Ibrahim, Johor Darul Takzian (MY); Namazi Bin Azhari, Selangor Darul Ehsan (MY); Adam Bin Baharum, Pulau Pinang (MY)

(73) Assignees: UNIVERSITI TEKNOLOGI MALAYSIA, Johor Bahru, Johor (MY); PAHLAWAN MIKRO, Sijangkang, Selangor Darul Ehsan (MY)

( * ) Notice: Subject to any disclaimer, the term of this patent is extended or adjusted under 35 U.S.C. 154(b) by 248 days.

(21) Appl. No.: 14/871,132

(22) Filed: Sep. 30, 2015

(65) Prior Publication Data
US 2016/0224486 A1   Aug. 4, 2016

Related U.S. Application Data

(60) Provisional application No. 62/032,141, filed on Aug. 1, 2014.

(51) Int. Cl.
| | |
|---|---|
| *G06F 13/42* | (2006.01) |
| *G06F 13/32* | (2006.01) |
| *G06F 13/16* | (2006.01) |
| *G06F 13/364* | (2006.01) |

(52) U.S. Cl.
CPC .......... *G06F 13/32* (2013.01); *G06F 13/1642* (2013.01); *G06F 13/1673* (2013.01); *G06F 13/364* (2013.01); *G06F 13/4282* (2013.01)

(58) Field of Classification Search
CPC .......... G06F 13/16; G06F 13/20; G06F 13/42; G06F 13/36
See application file for complete search history.

(56) References Cited

U.S. PATENT DOCUMENTS

| | | | | |
|---|---|---|---|---|
| 5,185,694 A | | 2/1993 | Edenfield et al. | |
| 6,065,088 A | * | 5/2000 | Bronson | G06F 13/4027 710/263 |
| 6,539,448 B1 | * | 3/2003 | Deng | G06F 13/26 710/260 |
| 6,665,807 B1 | * | 12/2003 | Kondo | G06F 13/4059 370/236 |
| 6,826,640 B1 | * | 11/2004 | Chang | G06F 13/362 370/438 |
| 7,039,770 B1 | * | 5/2006 | Chen | G06F 5/065 711/138 |

(Continued)

*Primary Examiner* — Henry Tsai
*Assistant Examiner* — Christopher A Daley
(74) *Attorney, Agent, or Firm* — Ladas & Parry LLP

(57) ABSTRACT

An I/O (input/output) bus arbiter to be used in conjunction with a compatible CPU (processor) to effect burst mode data transfers in all I/O accesses that remove the need for DMA (Direct-Memory-Access) signals, Bus-request/Bus-grant signals, and bridges consequently removing the need for a bus system to connect peripherals such as the PCI (Peripheral-Connect-Interface). The I/O arbiter consists of an interrupt controller with circular buffers, FIFOs (First-In-First-Out) and port engines for directly attaching devices with proper interface buffers, together with a compatible CPU interrupt signals, and synchronous data transfers with only this one arbiter.

6 Claims, 2 Drawing Sheets

(56) References Cited

U.S. PATENT DOCUMENTS

| | | |
|---|---|---|
| 7,096,293 B2 | 8/2006 | Lee |
| 7,363,407 B2 * | 4/2008 | Oshins .................. G06F 9/4812 710/260 |
| 7,539,805 B2 * | 5/2009 | Iwabuchi ............ G06F 13/3625 710/116 |
| 8,159,889 B2 * | 4/2012 | Ryu ...................... G06F 3/0619 365/198 |
| 9,135,193 B2 * | 9/2015 | Myrah .................... G06F 13/32 |
| 2002/0038393 A1 * | 3/2002 | Ganapathy .............. G06F 13/28 710/22 |
| 2003/0158608 A1 * | 8/2003 | Ishikawa .................. G06T 1/20 700/2 |
| 2004/0008713 A1 * | 1/2004 | Knight .................... G06F 13/28 370/428 |
| 2004/0098519 A1 * | 5/2004 | Cheung ................ G06F 13/385 710/52 |

\* cited by examiner

INTERRUPT-DRIVEN I/O ARBITER FOR A MICROCOMPUTER SYSTEM

TECHNICAL FIELD

This invention relates to I/O bus arbitration in a microcomputer system.

BACKGROUND OF THE INVENTION/ART

Conventional I/O bus arbiters and enabling technology developments.

Conventional I/O (Input/Output) bus arbiters are required in multibus system in SOC (System-On-Chip) architectures from the simple to the complex with not only a plurality of buses but plurality of arbiters too. For example, in an advanced communications processor such as the Intel IXP435, there exists in the single chip three bus arbiters, four different buses, and two bridges, even though the SOC is a single-CPU based on the ARM architecture, though with two hardware-support accelerators or co-processors. The Intel Pentium series of computer systems, and other microcomputer-based SOC systems also worked with the same scheme.

Most arbiters need at least two signals; the REQ-GNT (Request-Grant) pair for the bus request signal from a device, and the corresponding bus grant signal from the arbiter. This is in addition to the CPU (processor) DMA (direct memory access), INT (interrupt), and BUSREQ-BUSGNT (bus request-bus grant; a bus control signal pair). This means implementing a simple arbiter requires a thorough understanding and familiarity with a particular system. Often times the DMA is the most complex device in a PC system.

Conventional arbiters assume a minimal knowledge of the sources of I/O device requirements, in many cases zero knowledge, thus the need for complex hardware schemes such as an algorithm for prioritizing, time stamp for aging, and other dubious schemes when many can be made simple by having a fore-knowledge of the device transfer capability. These schemes now need some modifications in view of current model of processing which is packet oriented such as is required in broadband devices.

An example of how an I/O arbiter was implemented is to see how one popular arbiter chip was used in a typical system. The Intel 8289 was among a pioneering arbiter chip which was designed to work with the Intel 8288 bus controller and the Intel 8086 CPU, which is the forebear of all Intel-based Pentium computers. It is part of the Intel MCS-86 family of support chips which came out after the introduction of the Intel 8086 CPU in 1978. The 8289 also allows multi-arbiter chips thus allowing more chaos, when not only devices need bus arbitration but arbiters too need arbitration!

Somebody has already thought along this line of questioning the philosophy of complex arbitration schemes. U.S. Pat. No. 7,096,293B2 granted Aug. 22, 2006 for Samsung Electronics described an arbitration scheme relying heavily on one main CPU signal, ie., the INT (interrupt) signal. But this too required use of the traditional REQ-GNT signal pair for arbitration, which the patent also included the PCI bus.

In another field of development, U.S. Pat. No. 5,185,694 granted Feb. 9, 1993 for Motorola Inc., described one new instruction, the block MOVE which is a native CPU instruction that can perform burst-transfer of data under programmer control. Though the invention described burst-transfer between memory-memory, the idea can be applied to I/O as well.

Now the burst transfer or synchronous data transfer is a requirement for system throughput such that after the 1993 patent, we saw the burst-transfer as the fundamental operation of the PCI bus specification which Intel created in 1994. It is also the same concept used in the popular SDRAM which saw use in microcomputers from that year and was the mainstay technology until replaced by DDR in 2002, and then DDR2 well into 2009.

A burst-transfer of data needs FIFOs at each side of the two transmitting and receiving ports to match differing speed capabilities. These developments paved the way for the next improvement in I/O arbiter technology which is the subject of this invention.

SUMMARY OF THE INVENTION

The I/O Bus Arbiter Invention

Current microcomputer system view buses, arbiters, interrupts, DMA, bridges as separate entities that have to be treated separately. Current model treats devices as different in following the Unix logical device driver model breaking them into two; character device and block device. With different devices came the requirement for different I/O buses. When more than one I/O buses exist there must be bridges to isolate them and to hop from one bus to another. When all these are present there must be an arbiter for devices tied in each bus. And there must be additional arbiters to arbitrate between each arbiters. And then the interrupts signals, DMA signals must be connected to manage these independent data transfers. A very good example of this complex scheme can be better exemplified in the Intel IXP435 communication processor and the Intel Pentium series of processors that power the personal computers.

This invention combines all their functional objectives into one, while eliminating some for a simpler system but providing the same objectives with a better model.

This new I/O arbiter invention combines all the proven enabling data transfer technologies after years of use in many advanced systems, such as; burst-transfer or synchronous data transfer, FIFO, and hardware engines which is enabled by FPGA (Field-Programmable-Gate-Array), to create an I/O arbiter which is not only simple to understand and employ but promise to deliver at least an equivalent performance, if not better. Its main elegance is the uniformity of treating devices for bus access such that there is no need for other arbiters except this only one.

From a clean design which is best supported by an equally clean CPU design, traditional interface signals used in I/O arbiters which included the PCI bus are made redundant and can be completely removed from the system by just using the CPU interrupt signals and a set of three synchronous clock signals which are controlled by the CPU.

The simple reasoning behind this is that ultimately any process in a computer system is controlled by the interrupt, where the scheduler can preempt. Thus it can be made such that there is no need for other control signals to undermine the interrupt signals, in effect creating an interrupt-driven processes which forces a system designer to think in terms of interrupts. By viewing and making all I/O operations, internal CPU operations and streamlining them as a single unifying interrupt events and sources into the interrupt controller as pending interrupts immediately simplifies matters, and in one stroke create a whole new computer system paradigm.

The paradigm is that disparate devices whether they be character, block, boot ROMs, or networked devices can be viewed as one homogenous device with buffers and FIFOs.

The homogenous devices present the same interface to the I/O arbiter engine and ultimately to the CPU, differing only in the size of buffers and FIFOs. The scheme discourages the CPU from direct access to control registers in the devices; only the ability to read and write a block of complete 32-bit words ultimately removing physical device driver codes at the software level.

The model allows direct connection to devices no matter how complicated they are, without ever needing more than one I/O arbiter, bus bridges, and any bus such as the PCI with its electrical signal limitations.

The I/O arbiter invention can be summarized from a block diagram in FIG. 1 which depicts the three main components within the context of CPU (100) and device interfacing signals (106); an I/O arbiter and interrupt controller (105), a FIFO (104) and a port engine (102). A device whether character or block data transfer in nature is connected to a port engine which is responsible for a 32-bit word conversion from the device's format and an engine or FSM (Finite-State-Machine) for the control of the device's signals where necessary.

The main function of the I/O arbiter (101) in this embodiment is to connect one of the seven FIFO buses to the CPU (101) buses, one at a time in a burst transfer. A device requests attention by its associative FIFO by activating its dedicated INT signal, in which the arbiter and interrupt controller (105) queues the request in a circular buffer (216) in a first-come-first-serve basis.

The I/O arbiter process begins at the port engine (103) which converts whatever data format from the device (102) to a complete 32-bit word. The device transfers a packet of 32-bit data and the I/O arbiter has to buffer this data into the associated FIFO (104). Ultimately the CPU (100) needs this data to be in a buffer in main memory, like all other processes. When the FIFO (104) is full, the FIFO controller in the FIFO block (104) generates a unique interrupt. The I/O arbiter interrupt controller knows this comes from that particular port and queues the port identifier (ID) in the pending interrupt circular buffer.

When the port ID turn in the queue comes up, the I/O arbiter activates the CPU INT (107) and waits for the CPU INTA (Interrupt-Acknowledge) signal (108) in which the I/O arbiter places an interrupt vector which is just the port ID. The CPU (100) reads the ID and jumps to the interrupt service routine (ISR) for that vector, and knows that the port has a block of data in the FIFO (104) and reads them all to the main memory buffer reserved for that port.

Writing a block of data by the CPU (100) reverses the process. The CPU (100) can write a block of data at any time it is able to do so, or in response to an interrupt via the I/O arbiter (101). Remember that the CPU can read or write to a port only in burst mode utilizing in addition to the necessary 32-bit word and the port address, the synchronous clock signals in the group of control lines.

The I/O arbiter works fundamentally on interrupt triggering of I/O ports requiring services. All pending interrupts are queued in a circular buffer and translated to the single interrupt pin of the CPU together with the associated vector upon receiving INTA from the CPU. Each port has its own INT & INTA pins for the I/O arbiter to queue and issues INT to the CPU in turn.

BRIEF DESCRIPTION OF THE DRAWINGS

A more complete understanding of the invention may be obtained by reading the following description of a specific illustrative embodiment of the invention in conjunction with the appended drawings which are described as follows.

DETAILED DESCRIPTION

Figure 1:
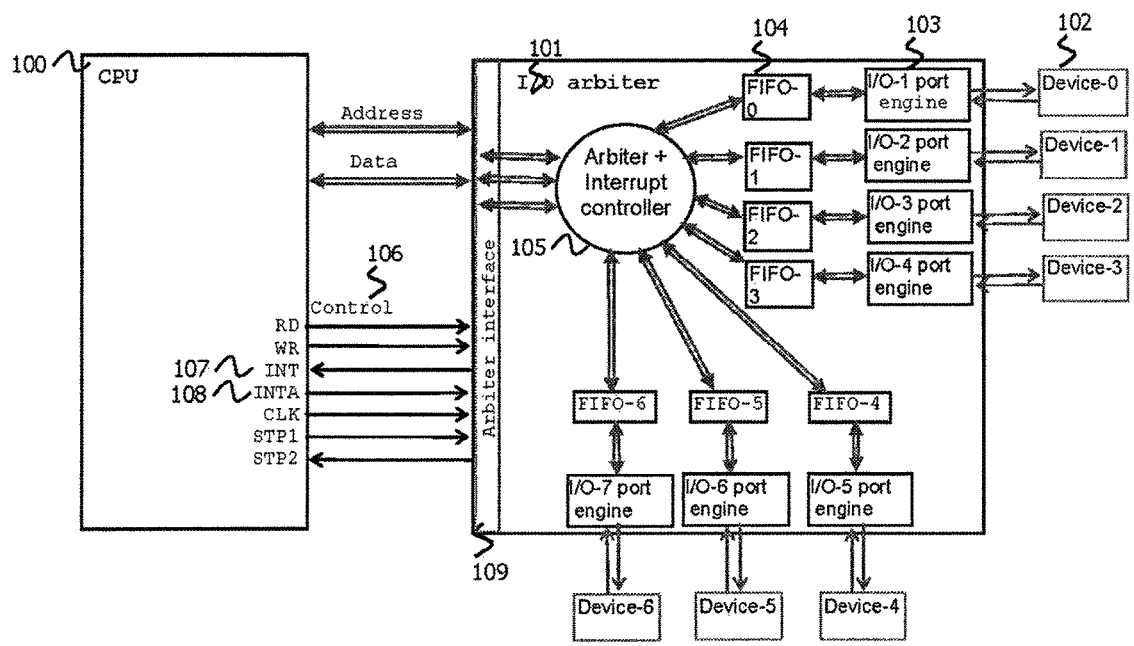
FIG. 1 shows the I/O arbiter invention with interface signals to a compatible CPU, showing its basic principles of operation.
Figure 2:
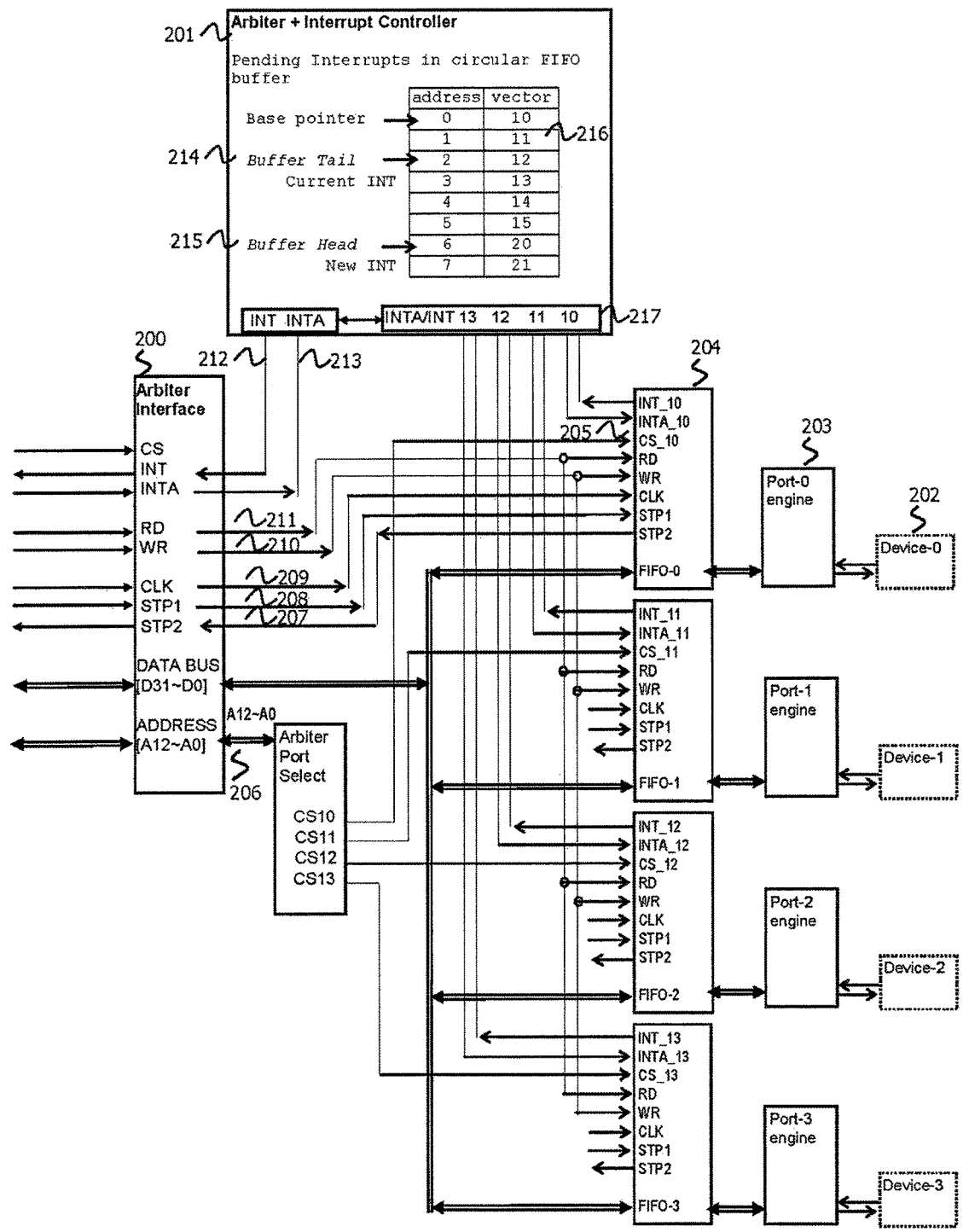
FIG. 2 shows the internal operation of the I/O arbiter with all the necessary interfacing signals.

The detailed description is based on FIG. 2. The I/O arbiter consists of the arbiter interface (200) the arbiter and interrupt controller (201), a plurality of FIFO modules an example being FIFO-0 (204), and a plurality of port engines an example being port-0 engine (203). Pluralities of devices an example being device-0 (202) which are not part of the arbiter in dotted boxes are shown for context. In this description, one of the devices' data paths is selected; device-0 (202) which is representative of all other devices connected to the I/O arbiter.

A key thing to note is that all synchronous burst transfers between the CPU (100) and FIFOs are controlled by the CPU (100) which is why the CLK (209) signal is unidirectional. With this condition any independent DMA transfer by a device is not possible.

Starting of Burst Data Transfer

Initial access of a FIFO device whether reading or writing a burst of data in response to an interrupt request, begins by a write command word to the intended FIFO. The command word is written to the FIFO device by activating the WR (210) signal together with the respective address lines ($A_{12}$~$A_0$) (206) forming a CS (Chip-Select) signal to select the FIFO device. The FIFO device on interpreting the command word responds with an active STP2 (207) signal which is an open-drain connection and tied to all the STP2 (207) signals. The CPU (100) then begins a burst mode data transfer by activating the CLK (209), STP1 (208), RD (211), and WR (210) signals.

Burst Transfer Protocol for Simple Complete Transfer for a Pre-Determined Length of Data Block either in Main Memory or in the FIFOs Recapitulating from the above paragraph for a specific process, reading from device-0 (202) is initiated by a CPU (100) write command word in which the WR (210) signal together with the respective address ($A_{12}$~$A_0$) (206) lines forming the CS_10 (205) to select the FIFO-0 (204) device. FIFO-0 (204) recognizes that the write operation is a command word phase instead of the beginning of a burst data transfer, by noting that the CLK (209) signal is inactive.

When FIFO-0 (204) decodes that the command word means the CPU (100) wants to read a block of data, FIFO-0 (204) immediately activates the STP2 (207) signal indicating it is ready for the command, in which the CPU (100) starts a burst-read sequence by activating the CLK (209) signal synchronously with the 32-bit block of data words in FIFO-0 (204). After a pre-determined block length has been transferred, FIFO-0 (204) activates the STP2 (207) signal to inform the CPU the end of the burst transfer as it has reached the end of FIFO buffer.

When writing to device-0 (204), similarly, after the command word phase, FIFO-0 (204) having decoded the word to be a write command, FIFO-0 (204) immediately activates the STP2 (207) signal indicating it is ready for the command, in which the CPU (100) starts a burst write sequence by activating the CLK (209) signal synchronously with the 32-bit block of data words in main memory. After a pre-determined block length has been transferred, the CPU (100) activates the STP1 (208) signal to inform FIFO-0 (204), the end of the burst transfer.

Burst Transfer Protocol for Incomplete Transfer of an Unknown Length of Data Block in the FIFOs Data transfer from the CPU (100) to the FIFOs is always known since it is under software control. The software can always know the number of data blocks, and the data length to device a strategy for an optimal data transfer. The only variable unavoidable is the data transfer from the devices, i.e. a burst read by the CPU (100), since there is no way as a priori to know the number of data blocks, and the data length coming from a device. For example, packets from a LAN device keep coming until its FIFO buffer overflows, in which case it will generate an interrupt.

It is in this situation that the interrupt controller comes into play; when there can be many devices requiring the CPU (100) to read out and empty their FIFOs.

Taking device-0 (204) data path, FIFO-0 (204) will generate a unique interrupt when the FIFO is full. The I/O arbiter interrupt controller (201) knows this comes from port-0 (204) and queues the port identifier (ID) in the pending interrupt circular buffer (216).

When the port ID turn in the queue comes up, the I/O arbiter (101) activates the CPU INT (212) and waits for the CPU INTA (213) (Interrupt-Acknowledge) signal in which the I/O arbiter (101) places an interrupt vector which is just the port ID. The CPU (100) reads the ID and jumps to the interrupt service routine (ISR) for that vector, and knows that the port has a block of data in FIFO-0 (204). The interrupt controller (201) at the end of its FSM cycle, and having determined that the next device to service is from FIFO-0 (204), activates the INTA (217) signal to FIFO-0 (204). FIFO-0 (204) acknowledges it is ready for transfer by activating the STP2 (207) signal to let the CPU (100) know to begin the burst-read sequence. The CPU (100) then reads them all to the main memory buffer reserved for that port-0 (203). When FIFO-0 (204) is empty, it activates the STP2 (207) signal which the CPU (100) knows that it signifies the end of the block transfer, and has to wait for the next interrupt from device-0 (202).

In the CPU (100) burst write transfer, FIFO-0 (204) will activate the STP2 (207) signal to inform the CPU (100) when its FIFO buffer is full, in which case the CPU (100) ends the burst-write cycle.

The interrupt controller (201) requires only the two signal pair INT (212)-INTA (212) from the CPU (100) for its FSM to figure out the pointers for the buffer head (215), and buffer tail (214) in managing all the pending interrupts in the system. It regenerates its own INT-INTA (217) cycle to all the devices attached to it.

The above description provides the basis for a system to attach any device to its ports whether character or block device, integrated circuits such as a ROM, hard-disk drive, Lan, another CPU, and anything else imaginable without any DMA mechanism, bridges, additional buses, or additional arbiters.

The present invention or any part(s) or function(s) thereof may be implemented using hardware, software, or a combination thereof, and maybe implemented in one or more computer systems or other processing systems. The computer system can include a main memory, preferably a random access memory, and may also include a secondary memory and a database. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner. The removable storage unit can represent a floppy disk, magnetic tape, optical disk, etc. which is read by and written to by the removable storage drive. As will be appreciated, the removable storage unit can include a computer program medium or computer usable storage medium having stored therein computer software and/or data. The terms "computer program medium" and "computer usable storage medium" are used to refer generally to media such as the removable storage drive, a hard disk installed in the hard disk drive, and signals. These computer program products provide software to the computer system. Computer programs or control logic are stored in the main memory and/or the secondary memory. Computer programs may also be received via the communications interface. Such computer programs or control logic (software), when executed, cause the computer system or its processor to perform the features and functions of the present invention, as discussed herein.

The invention claimed is:

1. An I/O (input-output) arbiter block in a microcomputer system, comprising:
    an arbiter and interrupt controller;
    a plurality of FIFOs (first-in-first out buffers); and
    a plurality of port-engines;
    wherein the I/O arbiter block is adapted to be implemented on a separate chip or integrated within a processor such that the I/O arbiter block removes many current data transfer methods in a computer board, including a microcomputer board, or a system-on-chip (SOC) device;
    wherein each of the FIFOs and each of the port-engines are implemented for each I/O device,
    wherein the I/O arbiter block uses a common processor interrupt signal pair INT-INTA, and three synchronous signals CLK, STP1, and STP2 in effecting a synchronous burst transfer of data between a CPU and the plurality of FIFOs, as all of the I/O devices are considered block devices, and
    wherein the I/O arbiter block does not require DMA (direct memory access) signals.

2. The I/O arbiter block according to claim 1, wherein the I/O arbiter block removes need for any bus bridges in a SOC (System on a chip) or a microcomputer system, by having the plurality of FIFOs and the plurality of port-engines, in cooperation with the common processor interrupt signal pair (INT-INTA), and the three synchronous signals CLK, STP1, and STP2.

3. The I/O arbiter block to claim 1,
    wherein the CLK signal is the synchronous data strobe, whereas the STP1 and the STP2 signals are for indicating an end of a burst period to and from one FIFO controller respectively.

4. The I/O arbiter block of claim 1,
    wherein the I/O arbiter block also removes need for DMA (Direct-Memory-Access) interface signals,
    wherein the DMA interface signals of the CPU control address channels to CPU address bus for direct access of a CPU main memory which on activation effectively shuts down the CPU, and
    wherein a DMA transfer can be mimicked under CPU control using the common processor interrupt signal pair INT-INTA, and the three synchronous signals CLK, STP1, and STP2 in effecting the synchronous burst transfer of data, as all I/O devices are considered block devices.

5. The I/O arbiter block of claim 1, wherein the I/O arbiter block removes need for traditional BUSREQ-BUSGNT (Bus-Request & Bus-Grant) pair of signals that controls bus mastering of the CPU which tristates or disables CPU addresses and data buses.

6. The I/O arbiter block of claim 1, wherein the microcomputer system does not comprise any additional arbiter.

* * * * *